United States Patent
Creusere

(10) Patent No.: US 6,466,698 B1
(45) Date of Patent: Oct. 15, 2002

(54) EFFICIENT EMBEDDED IMAGE AND VIDEO COMPRESSION SYSTEM USING LIFTED WAVELETS

(75) Inventor: Charles D. Creusere, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/276,181

(22) Filed: Mar. 25, 1999

(51) Int. Cl.$^7$ ................................................. G06K 9/36
(52) U.S. Cl. ................... 382/240; 232/233; 375/240.19
(58) Field of Search ............................. 382/240, 244, 382/232–233; 375/240.19, 240.25, 240.11, 240.18, 240.2; 358/426, 432; 709/203, 217

(56) References Cited

U.S. PATENT DOCUMENTS

| 5,315,670 A | | 5/1994 | Shapiro | ........................ 382/56 |
| 5,321,776 A | * | 6/1994 | Shapiro | ...................... 382/240 |
| 6,148,111 A | * | 11/2000 | Creusere | ...................... 382/240 |
| 6,314,452 B1 | * | 11/2001 | Dekel et al. | ................ 709/203 |

OTHER PUBLICATIONS

G.K. Wallace, "Overview of the JPEG (ISO/CCITT) Still Image Compression," *SPIE* vol. 1244, *Image Proc. Algorithms and Techniques*, 1990, pp. 220–233.
J.M. Shapiro, "Embedded Image Coding Using Zerotrees of Wavelet Coefficients," *IEEE Trans. on Signal processing*, vol. 41, No. 12, Dec. 1993, pp. 3445–3462.
Z. Xiong, K. Ramchandran, M.T. Orchard, "Wavelet Packet–Based Image Coding Using Joint Space–Frequency Quantization," *Proc. Int. Conf. on Image Proc.*, Nov.1994, Austin, TX, pp. 324–328.
A. Zandi, J.D. Allen, E.L. Schwartz, and M. Boliek, "CREW: Compression with Reversible Embedded Wavelets," Proc. Data Compression Conference, 1995, pp. 212–221.

A. Said and W.A. Pearlman, "An Image Multiresolutional Representation for Lossless and Lossy Compression," *IEEE Trans. on Image Proc.*, vol. 5, No. 9, Sep. 1996, pp. 1303–1310.
D. Taubman and A. Zakhor, "Multirate 3–D Subband Coding of Video," *IEEE Trans. on Image Proc.*, vol. 3, No. 5, Sep. 1994, pp. 572–588.
M. Lightstone and E. Majani, "Low Bit–Rate Design Considerations for Wavelet–Based Image Coding," *Multidimensional Systems and Signal Proc.*, 8, pp. 111–128 (1997).
I. Daubechies and W. Sweldons, "Factoring Wavelet Transforms into Lifting Steps," preprint Princeton University, 1996.
I. Daubechies, *Ten Lectures on Wavelets*, SIAM, Philadelphia, PA, 1992.
C.D. Creusere, "Spatially Partitioned Lossless Image Compression in an Embedded Framework," Conf. Rec. 31st Asilomar Conf. on Signals, Systems, and Computers, Nov. 1997, Pacific Grove, CA.
C.D. Creusere, "Fast Embedded Video Compression Using Cache–Based Processing," Proc. of the European Signal Processing Conf., Sep. 1998, ISle of Rhodes, Greece.
C.D. Creusere, "A New Method of Robust Image Compression Based on the Embedded Zerotree Wavelet Algorithm," *IEEE Trans. on Image Processing*, vol. 6, No. 10, Oct. 1997, pp. 1436–1442.
J. Shapiro, "A Fast Technique for Identifying Zerotrees in the EZW Algorithm," Proc. IEEE Int. Conf. on Acoustics, Speech, and Signal Proc., May 1996, Atlanta GA.
I.H. Witten, R.M. Neal, and J.G. Cleary, "Arithmetic Coding for Data Compression,"*Communications of the ACM*, vol. 30, No. 6, Jun. 1987, pp. 520–540.

* cited by examiner

*Primary Examiner*—Leo Boudreau
*Assistant Examiner*—Ishrat Sherali
(74) *Attorney, Agent, or Firm*—Gregory M. Bokar; Anthony J. Serventi

(57) ABSTRACT

An image compression system for implementing a zerotree wavelet compression algorithm. The compression system uses a wavelet based coding system which takes advantage of the correlation between insignificant coefficients at different scales.

16 Claims, 3 Drawing Sheets

| $LL_0$ | $LH_0$ | $LL_0$ | $LH_0$ | $LL_0$ | $LH_0$ |
|---|---|---|---|---|---|
| $HL_0$ | $HH_0$ | $HL_0$ | $HH_0$ | $HL_0$ | $HH_0$ |
| $LL_0$ | $LH_0$ | $LL_0$ | $LH_0$ | $LL_0$ | $LH_0$ |
| $HL_0$ | $HH_0$ | $HL_0$ | $HH_0$ | $HL_0$ | $HH_0$ |
| $LL_0$ | $LH_0$ | $LL_0$ | $LH_0$ | | |
FIG. 7
| $LL_1$ | $LH_1$ | $LH_0$ | $LH_0$ | $LL_1$ | $LH_0$ |
|---|---|---|---|---|---|
| $HL_0$ | $HH_0$ | $HL_0$ | $HH_0$ | $HL_0$ | $HH_0$ |
| $HL_1$ | $LH_1$ | $HH_1$ | $LH_0$ | $HL_1$ | $LH_0$ |
| $HL_0$ | $HH_0$ | $HL_0$ | $HH_0$ | $HL_0$ | $HH_0$ |
| $LL_1$ | $LH_0$ | $LH_1$ | $LH_0$ | $LL_1$ | |
FIG. 8
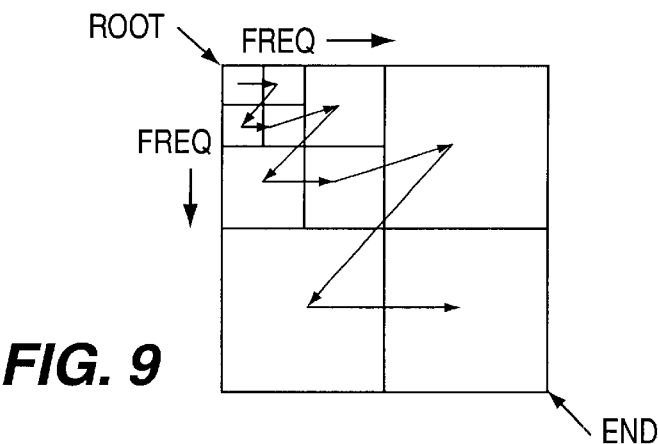
FIG. 9
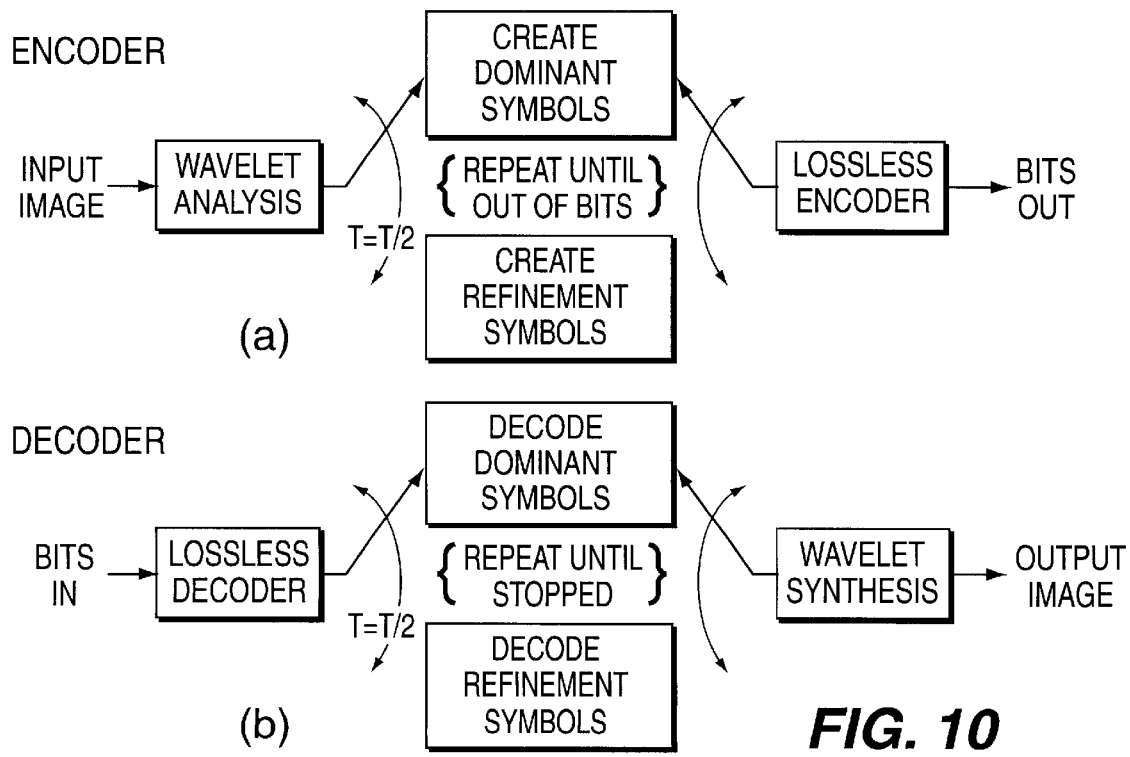
FIG. 10

EFFICIENT EMBEDDED IMAGE AND VIDEO COMPRESSION SYSTEM USING LIFTED WAVELETS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates generally to a system for the compression and decompression of digitized imagery which is useful both for transmission through narrow bandwidth communications channels and efficient archival storage in a data retrieval system. More specifically, to minimize computational complexity and memory usage, the system described herein uses lifting to implement its wavelet transforms and performs embedded coefficient coding in-place, i.e., without reorganizing the data into traditional subbands. By processing the data in-place, data movement is minimized in both the encoder and decoder and scratch memory requirements are greatly reduced.

2. Brief Description of the Related Art

Digital data compression systems are useful to reduce the number of bits required to represent a signal in digital form. Digital data is typically compressed to either facilitate transmission of the signal through a limited-bandwidth communications channel or to reduce the amount of memory needed to store that signal on some archival media such as a computer hard disk. Digital data compression can be achieved using either lossless or lossy coding techniques. Lossless coding involves only the extraction of statistical redundancy from the signal, and, thus, the amount of compression possible is signal dependent with compression ratios of 2:1 common for natural images.

To get higher levels of compression or to code the signal at a fixed bit rate, some distortion must be accepted in the reconstructed signal, resulting in a loss of information when the signal is passed through the complete encoding and decoding system. The goal of a good lossy coding system, then, is to minimize the distortion introduced into the signal at all of the bit rates for which the system is designed to operate, e.g., attaining the best rate-distortion performance possible.

A variety of image compression algorithms and systems have been proposed in recent years. Many of the algorithms with the best rate-distortion performance such as the Joint Photographics Experts Group (JPEG), described in "Overview of the JPEG (ISO/CCITT) Still Image Compression" by G. K. Wallace in SPIE, Vol. 1244, *Image Proc. Algorithms and Techniques*, 1990, pp. 220–233, and Zerotree Coders, described in "Embedded Image Coding Using Zerotrees of Wavelet Coefficients" by J. M. Shapiro in *IEEE Trans. On Signal Processing*, Vol. 41, No. 12, December 1993, pp. 3445–3462, the disclosures of which are herein incorporated by reference, use transforms to decorrelate image pixels before coding of the data. The JPEG standard relies on a block-based discrete cosine transform (DCT). A coding algorithm based on the wavelet-packet transform showing improved rate-distortion performance for difficult images is described in "Wavelet Packet-Based Image Coding Using Joint Space-Frequency Quantization" by Z. Xiong, K. Ramchandran and M. T. Orchard in *Proc. Int. Conf On Image Proc.*, November 1994, Austin, Tex., pp. 324–328, the disclosure of which is herein incorporated by reference.

The zerotree coder uses a multiresolutional wavelet transform and takes advantage of the correlation between insignificant coefficients at different scales. U.S. Pat. No. 5,315,670, to James M. Shapiro, entitled "Digital Data Compression System Including Zerotree Coefficient Coding" discloses a digital data processing system which includes means for generating a tree structure of data representative coefficients with the tree structure having multiple paths from coefficients generated at a level of coarsest information to coefficients generated at a level of relatively finer information. The coefficients are evaluated to distinguish between significant and insignificant coefficients. Means are also included for generating a dedicated symbol representing a related association of insignificant coefficients within the tree structure, from a root coefficient of the tree structure to a set of end coefficients of the tree structure. The symbol represents that neither the root coefficient of the tree structure nor any descendant of the root coefficient has a magnitude greater than a given reference level. A coefficient is considered to be insignificant and a "root of a zerotree", whereby all descendants are predictably insignificant, if (a) the coefficient has an insignificant magnitude, (b) the coefficient is not the descendant of a root from a coarser level, and (c) all the descendants of the coefficient at finer levels have insignificant magnitudes. A coefficient found to be a zerotree root is coded with a dedicated symbol which is eventually processed by an entropy coder.

Other embedded compression algorithms that rely on inter-subband redundancy extraction are detailed in articles entitled "CREW: Compression with Reversible Embedded Wavelets," by A. Zandi, J. D. Allen, E. L. Schwartz, and M. Boliek, *Proc. Data Compression Conference*, 1995, pp. 212–221; and "An Image Multiresolution Representation for Lossless and Lossy Compression," by A. Said and W. A. Pearlman, *IEEE Trans. on Image Proc.*, Vol. 5, No. 9, September 1996, pp. 1303–1310 (detailing SPIHT—Set Partitioning in Hierarchical Trees); and "Multirate 3-D Subband Coding of Video," by D. Taubman and A. Zakhor, *IEEE Trans. on Image Proc.*, Vol.3, No. 5, September 1994, pp. 572–588 (detailing LZC—Layered zero coding), the disclosures of which are herein incorporated by reference.

Fundamental to all of these compression algorithms is the wavelet transform. An infinite number of different wavelets exist, but as detailed in an article entitled "Low Bit-Rate Design Considerations for Wavelet-Based Image Coding," by M. Lightstone and E. Majani, *Multidimensional Systems and Signal Proc.*, 8, pp. 111–128 (1997), the disclosure of which is herein incorporated by reference, short, biorthogonal wavelets tend to provide the best results for image and video compression. Such wavelets are typically constructed using multirate digital filter banks. A wavelet coefficient mapping is created by iteratively decomposing the low-low band (low vertical frequency, low horizontal frequency), where the wavelet coefficients are organized in distinct dyadic subbands ranging from low frequency in the upper left-hand corner to high in the lower right. In the absence of coefficient quantization, i.e., with lossless compression, the original image can be reconstructed by iteratively applying the inverse wavelet transform.

In view of the foregoing, there is a need for a compression system that provides a more efficient and flexible way of correlating between insignificant coefficients at different scales incorporated into a zerotree coder.

SUMMARY OF THE INVENTION

It is an object of the present invention to provide a system that relies on lifted wavelets to perform analysis and synthesis, and processes the coefficients that result from such transforms in-place, using algebraically-calculated parent-child zerotree relationships rather than the memory-consuming linked lists previously known.

It is further an object of the present invention to apply the efficient zerotree indexing scheme to other embedded compression algorithms.

These and other objects are accomplished by the present invention that includes a system for compressing digital data comprising an image, the image collected for electronic manipulation, means for converting the image using lifted wavelet transforms, and, means for applying the converted image.

The present invention further includes a method for converting an image, comprising the steps of acquiring an image, storing the acquired image as a data array in a memory system, progressively replacing pixel elements of the stored data array with transform coefficient elements through the lifted transformation, scanning the transform coefficients to create an embedded symbol stream, and, losslessly encoding the embedded symbol stream to create an embedded bit stream.

Additionally, the present invention includes a digital data compression and decompression system comprising the steps of encoding and decoding individual regions of an image controlled through a simple indexing scheme.

BRIEF DESCRIPTION OF THE DRAWING

FIG. 7 illustrates in-place organization of wavelet coefficients in array img after 1 iteration of lifted wavelet decomposition, with the boxes indicating coefficients to be processed during next iteration of the transform;

FIG. 8 illustrates in-place organization of wavelet coefficients in array img after 2 iterations of lifted wavelet decomposition, with the boxes indicating coefficients to be processed during next iteration of the transform;

FIG. 9 illustrates coefficient scanning order for symbol generation where root points to start and end points to end;

FIG. 10A is a block diagram of generic embedded wavelet encoder; and,

FIG. 10B is a block diagram of generic decoder.

DETAILED DESCRIPTION OF THE PREFERRED EMBODIMENT

The present invention relates generally to a system for the compression and decompression of digitized imagery which is useful both for transmission through narrow bandwidth communications channels and efficient archival storage in a data retrieval system. An initial image is collected for electronic manipulation into a resultant or converted image which may be applied to a variety of different uses, such as being displayed, manipulated, printed, viewed and/or similarly utilized within and outside of a computer system, as determinable by those skilled in the art. Preferably, the converted image is displayed at a different location than an initial image, or at the same location but at a different time. To minimize computational complexity and memory usage, the system described herein uses lifting to implement its wavelet transforms and performs embedded coefficient coding in-place, i.e., without reorganizing the data into traditional subbands. By processing the data in-place, data movement is minimized in both the encoder and decoder and scratch memory requirements are greatly reduced. The present invention allows the transform coefficients to be scanned in a predetermined deterministic order.

The present invention focuses on a wavelet-based coding system which generates an embedded bit stream. The compression system of the present invention takes advantage of the correlation between insignificant coefficients at different scales of the zerotree coder in a more efficient and flexible way than previously known. In particular, the present invention relies on lifted wavelets to perform analysis and synthesis, and it processes the coefficients that result from such transforms in-place, using algebraically-calculated parent-child zerotree relationships. The zerotree indexing scheme is equally applicable to Zerotree Coders, CREW, SPIHT, LZC and other embedded compression algorithms that rely on inter-subband redundancy extraction.

Figure 1:
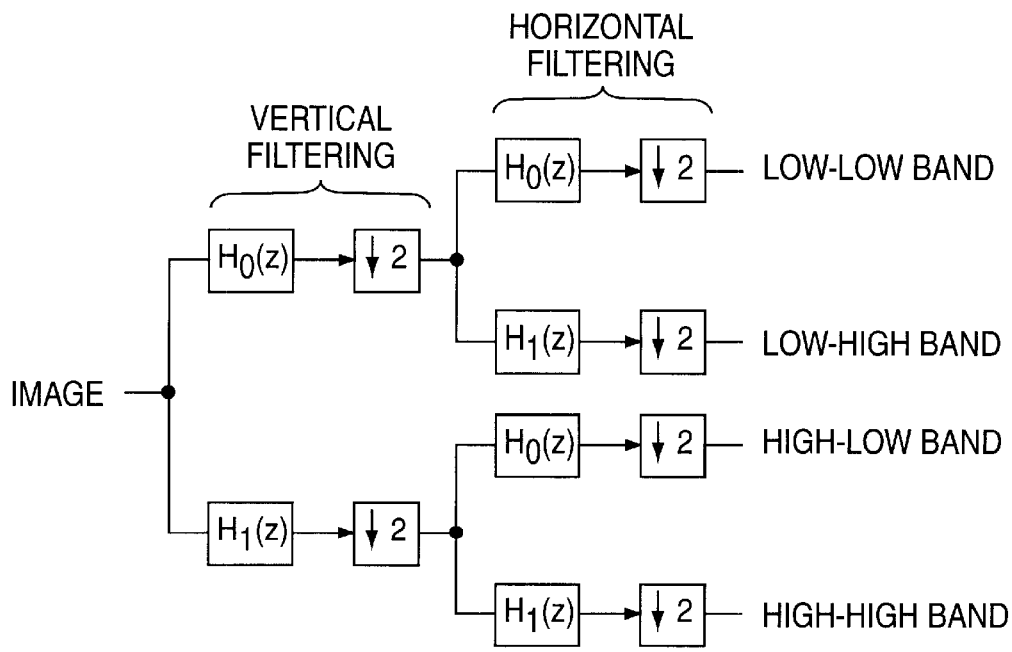
FIG. 1 is a block diagram of one level of a 2D discrete wavelet transform.
Figure 2:
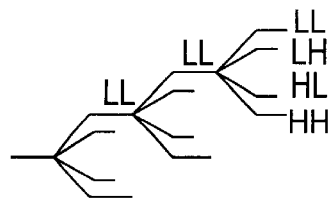
FIG. 2 is a block diagram of the structure of a 3-level wavelet transform having each node implemented as in FIG. 1.

Wavelet transform is fundamental to compression algorithms, with an infinite number of different wavelets existing. However, short, biorthogonal wavelets tend to provide the best results for image and video compression. Referring to FIGS. 1 and 2, FIG. 1 is a block diagram of one level of a 2D discrete wavelet transform and FIG. 2 is a block diagram of the structure of a 3-level wavelet transform having each node implemented as in FIG. 1. To analyze an image, a separable 2D wavelet transform may be used. A 2D wavelet transform is formed by applying the 4-band multirate filter bank, shown in FIG. 1 first to the pixels, or data bits, that compose the image and again to each successive low-low band output of a previous decomposition. This process forms the tree, shown in FIG. 2, and it continues until only one sample remains in a final low-low band (for coding applications, successive decomposition is stopped before this point). In FIG. 1, the blocks labeled $H_0(z)$ and $H_1(z)$ represent the convolution of the input signal with lowpass filters and highpass filters. Filters operate first in a vertical direction and then in a horizontal direction to form a separable 2D decomposition. The signal is downsampled by a factor of two, as depicted by blocks/circuits, and shown in FIG. 1 as 2, after each filtering operation, i.e., every other sample is discarded. This results in the same number of wavelet coefficients after filtering as there were pixels in the original image.

Figure 3:
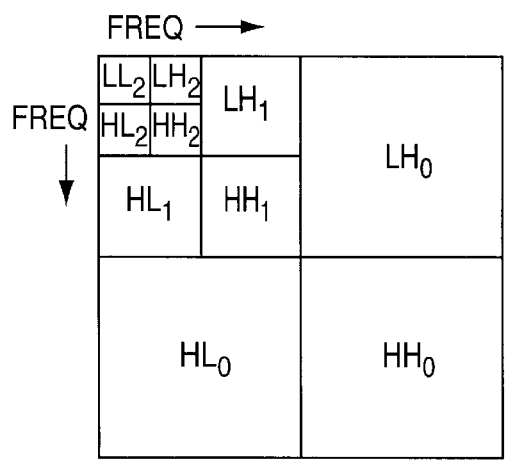
FIG. 3 is a representation of a wavelet coefficient map for 3-level decomposition.
Figure 4:
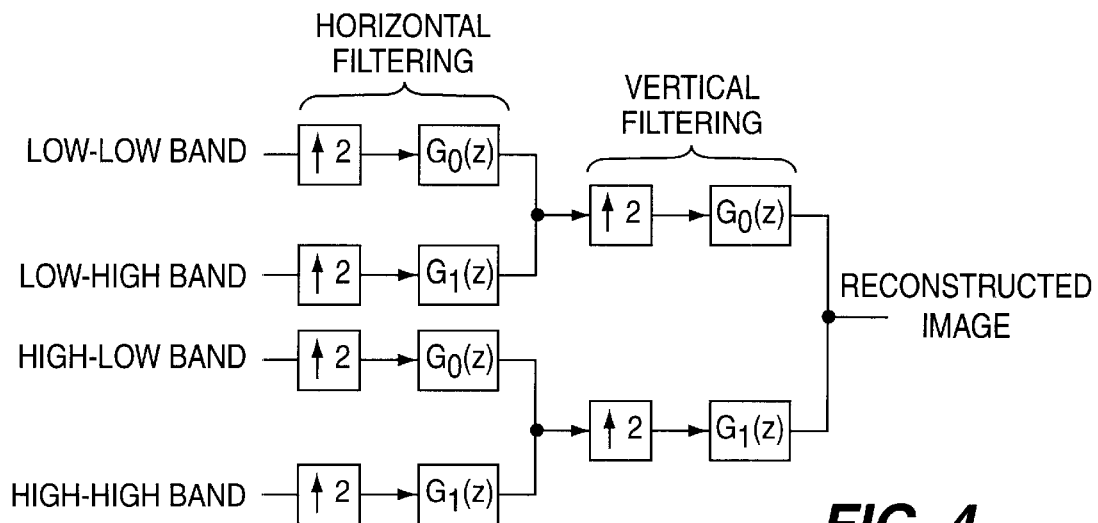
FIG. 4 illustrates one level of an inverse discrete wavelet transform for reconstructing an image.

In referring to FIGS. 3 and 4, FIG. 3 is a representation of a wavelet coefficient map for a 3-level decomposition and FIG. 4 illustrates one level of an inverse discrete wavelet transform for reconstructing an image. By iteratively decomposing the low-low band (low vertical frequency, low horizontal frequency), as shown in FIG. 2, wavelet coefficient mapping, as illustrated by FIG. 3 is produced, where the wavelet coefficients are organized in distinct dyadic subbands ranging from low frequency in the upper left-hand corner to high in the lower right. As seen in FIG. 3, a mapping provides for a 3-level wavelet decomposition which organizes the wavelet coefficients as a succession of subimages. If the filters, shown as $H_0(z)$ and $H_1(z)$ in FIG. 1 are chosen correctly, then the original signal can be perfectly reconstructed using successive applications of the 4-band synthesis filter bank, indicated by $G_0(z)$ and $G_1(z)$, shown in FIG. 4. In the absence of coefficient quantization, i.e., with lossless compression, the original image can be reconstructed by iteratively applying the inverse wavelet transform, as illustrated in FIG. 4. Four band synthesis filter bank includes low pass filters, high pass filters, and blocks/circuits which upsample by a factor of two to provide a reconstructed image. A five level wavelet decomposition may also be used to organize the wavelet coefficients as a succession of subimages.

Figure 5:
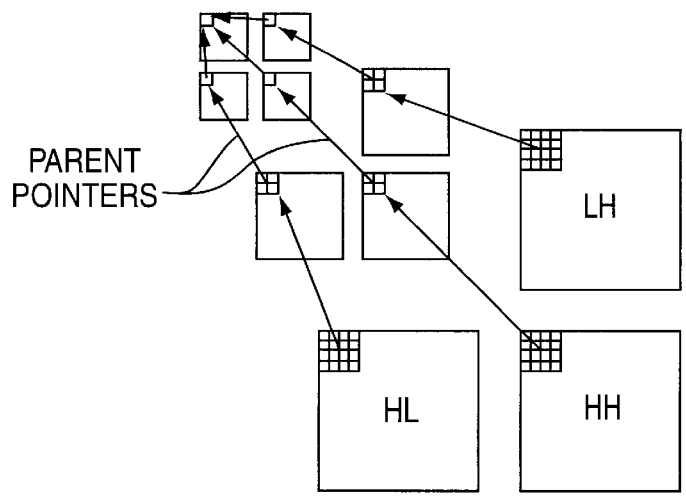
FIG. 5 illustrates the zerotree relationships between wavelet coefficients in different bands.

It is within the subband framework of FIG. 3 that embedded coding algorithms operate. In particular, such algorithms exploit the correlation between wavelet coefficients in different subbands which correspond to the same spatial region of the image. Such a relationship is called a zerotree and is illustrated in FIG. 5, showing the zerotree relationships between wavelet coefficients in different bands. FIG. 5 illustrates the parent/child relationships for one complete zerotree with arrows identifying parent pointers. It should be noted that a zerotree root can occur at any node (wavelet coefficient) within the quadtree structure and that no coefficient symbols below a zerotree root need be transmitted to the receiver. Zerotree relationships may be exploited directly as discussed in U.S. Pat. No. 5,315,670 (Shapiro) and "CREW: Compression with Reversible Embedded Wavelets," previously described, through the use of a zerotree root symbol (ZTR). Zerotree relationships also may be exploited indirectly as discussed in "Multirate 3-D Subband Coding of Video," described above, by using context-based arithmetic coding models. The method detailed in "An Image Multiresolution Representation for Lossless and Lossy Compression," discussed above, exploits these relationships directly, but it does so in a more complex manner, incrementally examining subbands one at a time from low to high frequency.

Figure 6:
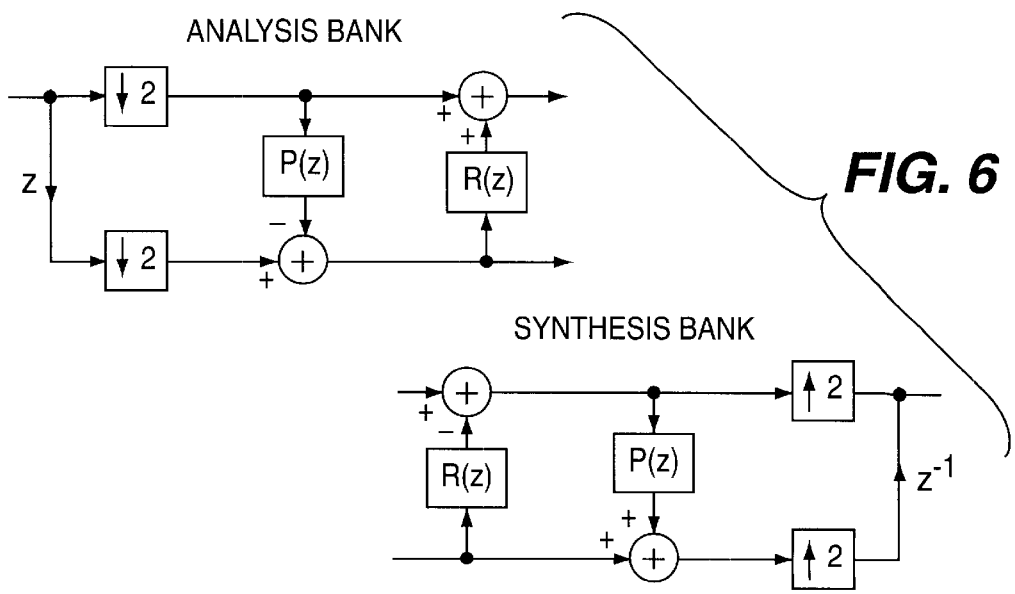
FIG. 6 illustrates 2-band 1-dimensional multirate filter bank (wavelet) implemented using lifting.

Any biorthogonal wavelet transform can also be implemented with a finite number of lifting and update stages. FIG. 6 shows a 2-band 1-dimensional multirate filter bank (wavelet) implemented using lifting. A simple lifted wavelet transform, illustrated in FIG. 6, may perform the same function as the individual vertical and horizontal filtering portions of FIG. 1.

Lifted wavelets possess several advantages. These wavelets have a lower computational complexity since computations are shared between the lowpass and highpass filters, resulting in computational saving of as much as 50%. The lifted wavelets also provide perfect reconstruction due to their lifted structure even if the outputs of digital filters $P(z)$ and $R(z)$ are truncated. This allows the construction of integer-to-integer wavelets which are suitable for lossless image compression. Additionally, the wavelet calculations are performed in-place, meaning that values in the original image data array are directly replaced with wavelet coefficients in an incremental manner, such that virtually no additional scratch memory is required during wavelet analysis and synthesis. This in-place calculation is only useful if the transformed wavelet coefficients can be efficiently accessed after completion of the wavelet transform. If it is necessary to reorder the transformed wavelet coefficients into the subband form, shown in FIG. 3, prior to coding or after decoding, then the effectiveness of using a lifted wavelet transform will be diminished.

The organization of the information within the 2D image array after 1 level of lifted wavelet decomposition, also called or labeled "img". FIG. 7 illustrates in-place organization of wavelet coefficients in array img after 1 iteration of lifted wavelet decomposition, with the boxes indicating coefficients to be processed during next iteration of the transform. With a conventional subband filter bank implementation, the data is naturally output as distinct subbands, shown in FIG. 3, but lifting spreads the subband data throughout the original image array. The next level of lifted decomposition processes only the LL (low-low) samples in the array and results in further fragmentation of the subband mapping, as shown in FIG. 8, where $LL_1$ (low vertical and horizontal twice filtered) is the lowest frequency band. FIG. 8 illustrates in-place organization of wavelet coefficients in array img after 2 iterations of lifted wavelet decomposition, with the boxes indicating coefficients to be processed during next iteration of the transform. The samples with the same labels are from the same frequency subband.

The present invention comprises an encoder that accepts as its input an image or video frame and outputs a stream of bits which represents that image in an efficient manner, i.e., a minimal number of bits for a specified reconstruction error. A lifted wavelet transform is performed, such as that shown in FIG. 6, first vertically on the image array and then horizontally resulting in the data organization illustrated in FIG. 7. The transform is iterated on the lowest frequency coefficients in the array typically 4 to 6 times depending of the size of the image. Any lifted transformation can be used within the proposed coding framework, since all lifted transformation results in the same coefficient organization upon completion. A decomposition based on the highly efficient 5/3 biorthogonal wavelet requires only one lifting stage $P(z)$ and one update stage $R(z)$, both of which are multiplierless. In terms of the conventional implementations of FIGS. 1 and 4, the filter transfer functions are:

the lowpass analysis filter:

$$H_0(z) = -0.125 + 0.25z^{-1} + 0.75z^{-2} + 0.25z^{-3} - 0.125z^{-4};$$

the highpass analysis filter:

$$H_1(z) = -0.25 + 0.5z^{-1} - 0.25z^{-2};$$

the lowpass synthesis filter:

$$G_0(z) = 0.25 + 0.5z^{-1} + 0.25z^{-2};$$

and the highpass synthesis filter:

$$G_1(z) = -0.125 - 0.25z^{-1} + 0.75z^{-2} - 0.25z^{-3} - 0.125z^{-4}.$$

The complex variable z is a delay element in the practical implementation of these FIR (finite impulse response) filters. In C-language computer code, the lifted implementation of the 4-band 2D decomposition, functionally equivalent to that shown in FIG. 1, is given by code sequence (1), below:

```
index = 1<<scale;                    (1)
/* Perform vertical transform */
for(k=0;k<XSIZE;k+=index)
    {
    img[index][k] =0 (img[index][k]>>1) - ((img[0][k]+img[2*index][k])>>2);
    img[0][k] += img[index][k];
    for(1=index;1<YSIZE/2-index;1+=index)
        {
        img[2*1+index][k] = (img[2*1+index][k]>>1) -
((img[2*1][k]+img[2*1+2*index][k]>>2);
        img[2*1][k]+ = ((img[2*1+index][k]+img[2*1-index][k]t)>>1);
        }
    img[YSIZE-index][k] = (img[YSIZE-index][k]-img[YSIZE-2*index][k])>>1;
    img[YSIZE-2*index][k] += ((img[YSIZE-index][k]+img[YSIZE-
3*index][k])>>1);   }
/* Perform horizontal transform */
for(k=0;k<YSIZE;k+=index)
    {
    img[k][index] -= ((img[k][0]+img[k][2*index])>>1);
    img[k][0] = (img[k][0]<<1) + img[k][index];
    for(1=index;1<XSIZE/2-index;1+=index)
        {
        img[k][2*1+index] -= ((img[k][2*1]+img[k][2*1+2*index])>>1);
        img[k][2*1] = (img[k][2*1]<<1) + ((img[k][2*1+index]+img[k][2*1-
index])>>1);
        }
    img[k][XSIZE-index] -= img[k][XSIZE-2*index];
    img[k][XSIZE-2*index] = (img[k][XSIZE-2*index]<<1) + ((img[k][XSIZE-
index]+img[k][XSIZE-3*index])>>1);
    }
```

At the start of the first iteration, the array img contains an image of size XSIZE×YSIZE and scale is set equal to 0. During each subsequent iteration of the lifted wavelet transform, scale increases by 1 and selected components, such as the low-low components, of the img array are re-processed to generate new levels of the decomposition. The transform implemented by code sequence (1) has unitary-like scaling, for example, each of the coefficients of the original non-lifted filters G and H is effectively multiplied by square root of 2 (sqrt). Additionally, the filters are shortened at the edges of the image.

The coefficients are subsequently converted into bits for transmission by an encoding process using, for example, an embedded zerotree wavelet (EZW) coding. Efficient interscale access to the wavelet coefficients within the in-place data array, however, is widely applicable to a variety of coding algorithms. A conceptual and functional discussion of EZW is disclosed in U.S. Pat. No. 5,315,670 (Shapiro), the disclose of which is herein incorporated by reference, and the article "Embedded Image Coding Using Zerotrees of Wavelet Coefficients" by Shapiro, described above. Fundamentally, there is a strong correlation between insignificant coefficients at the same spatial locations in different wavelet scales, such as, if a wavelet coefficient at a coarser scale is zero, then it is more likely that the corresponding wavelet coefficients at finer scales will also be zero. FIG. 5 shows a 3-level, 2D wavelet decomposition with the links defining a single zerotree structure. If the wavelet coefficient at a given scale is zero along with all of its descendants, then a special symbol indicating a zerotree root (ZTR) is transmitted, eliminating the need to transmit any symbols for the descendants. Thus, the correlation of insignificance across scales results in a net decrease in the number of bits transmitted. In order to generate an embedded code where information is transmitted in order of importance, Shapiro discloses an algorithm that scans the wavelet coefficients in a bit-plane fashion. Starting with a threshold determined from the magnitude of the largest coefficient, the algorithm sweeps through the coefficients from low to high frequency subbands, as shown in FIG. 9. The dominant pass performs a raster scan within each subband, transmitting the sign (+or −) if a coefficient's magnitude is greater than the threshold, i.e., it is significant, a ZTR if it is less than the threshold but the root of a zerotree at the coarsest possible scale, or a 0. Next, for the subordinate pass, all coefficients deemed significant in the dominant pass are added to a second subordinate list which is itself scanned, adding one bit of resolution to the decoder's representation of each significant coefficient. The threshold is then halved and the two passes are repeated with those coefficients having been found significant previously being replaced by zeros in the dominant pass, so that the coefficients do not inhibit the formation of zerotrees in subsequent iterations. The process continues until the bit budget is exhausted; at which time the encoder transmits a stop symbol and its operation is terminated. This provides a coding process that accesses the wavelet coefficients in a number of different ways. First, the wavelet coefficients are accessed in the symbol scanning order, shown in FIG. 9, in order to generate the actual bit stream. Additionally, quick access to the parent and child of any given wavelet coefficient is necessary, as shown in FIG. 5, in order to compute ZTR symbols and to block out unsent zero-valued coefficients. Furthermore, in many applications it is also important to be able to access and scan the zerotrees corresponding to specific locations within the image. This is important in supporting spatially selective compression, high-speed cache-based compression, compression which is robust to transmission errors, and parallel compression on distributed memory systems.

Two problems must be overcome when using in-place lifted wavelets: the subband data is interleaved in a complex fashion making access difficult and the number of linked lists or lookup tables required can significantly increase memory storage demands. Common methods of dealing with complex indexing relationships generally require large amounts of scratch memory space which may eliminate most of the benefits achieved by using lifted wavelets.

The present invention overcomes this problem using highly efficient ways to directly access the lifted wavelet coefficients for symbol scanning, parent finding, child finding, and individual region processing. Addresses in the wavelet coefficient array, which is the same array that originally contained the image pixels, are calculated using algebraic formulas or small lookup tables, removing the necessity of dynamic linked lists. This is exemplified by considering the problem of scanning forward and backward through 1 zerotree, i.e., all of the wavelet coefficients corresponding to one spatial region in the image. To simplify the discussion, we define two lookup tables, ylut[ ] and xlut[ ], each of size $2^{2*NSCALES}$ where NSCALES is the depth of the wavelet decomposition. Memory usage may be further reduced by eliminating the tables, but the elimination of the tables makes the source code slightly more difficult to understand and the gains incurred by doing this are small since the tables size only with the wavelet transform depth and do not increase with the image size. These tables are filled as shown in sequence code (2), below:

```
i = 0;
k=NSCALES-2;
for(j=0;j<(1<<NSCALES);j+=(2<<k))
    for(l=0;l<(1<<NSCALES);l+=(2<<k))
        {
        ylut[i] = j;
        xlut[i++] = 1;
        }
for(k=NSCALES-2;k>=0;k--)
    {
    for(j=0;j<(1<<NSCALES);j+=(2<<k))
        for(l=(1<<k);l<(1<<NSCALES);l+=(2<<k))
            {
            ylut[i] = j;
            xlut[i++] = 1;
            }                                             (2)
    for(j=(1<<k);j<(1<<NSCALES);j+=(2<<k))
        for(l=0;l<(1<<NSCALES);l+=(2<<k))
            {
            ylut[i] = j;
            xlut[i++] = 1;
            }
    for(j=(1<<k);j<(1<<NSCALES);j+=(2<<k))
        for(l=(1<<k);l<(1<<NSCALES);l+=(2<<k))
            {
            ylut[i] = j;
            xlut[i++] = 1;
            }
    }
```

Using these tables each zerotree can be easily scanned in either a forward, low to high frequency, or backward order. The scanning process may be exemplified as follows: during the process of batch ZTR calculation required to encode an image, as described in "A Fast Technique for Identifying Zerotrees in the EZW Algorithm" by J. Shapiro, *Proc. IEEE Int. Conf On Acoustics, Speech, and Signal Proc.,* May 1996, Atlanta, Ga., the disclosure of which is herein incorporated by reference, it is necessary for each child to pass the position of its most significant bit up to its parent. If the array storing this significance information, ztl[s][i], (an array ¼ the size of img where s=AX*y+x references the zerotree's spatial location (x,y) in the coefficient mapping and AX=XSIZE/$2^{NSCALES}$) is first taken to zero, then the following algorithm can be used to implicitly calculate the appropriate parent indices and fill the ztl array, shown in code sequence (3), below:

```
i = 255;
s = AX*y+x;
ns = (1<<NSCALES);
while (i>=64)
    {
    p = 4*(i/16)+3;
    ztl[s][p] = ztl[s][p] | tlut(abs(img[ylut[i]+y*ns][xlut[i--]+x*ns]));
    ztl[s][p] = ztl[s][p] | tlut(abs(img[ylut[i]+y*ns][xlut[i--]+x*ns]));
    p = 4*(i/16)+2;
    ztl[s][p] = ztl[s][p] | tlut(abs(img[ylut[i]+y*ns][xlut[i--]+x*ns]));
    ztl[s][p] = ztl[s][p] | tlut(abs(img[ylut[i]+y*ns][xlut[i--]+x*ns]));
    p = 4*(i/16)+1;
    ztl[s][p] = ztl[s][p] | tlut(abs(img[ylut[i]+y*ns][xlut[i--]+x*ns]));
    ztl[s][p] = ztl[s][p] | tlut(abs(img[ylut[i]+y*ns][xlut[i--]+x*ns]));
    p = 4*(i/16);
    ztl[s][p] = ztl[s][p] | tlut(abs(img[ylut[i]+y*ns][xlut[i--]+x*ns]));
    ztl[s][p] = ztl[s][p] | tlut(abs(img[ylut[i]+y*ns][xlut[i--]+x*ns]));
    }
i = 63;
while (i>=16)                                             (3)
    {
    p = 2*(i/8)+1;
    ztl[s][i] = ztl[s][i] | tlut(abs(img[ylut[i]+y*ns][xlut[i]+x*ns]));
    ztl[s][p] = ztl[s][p] | ztl[s][i--];
    ztl[s][i] = ztl[s][i] | tlut(abs(img[ylut[i]+y*ns][xlut[i--]+x*ns]));
    ztl[s][p] = ztl[s][p] | ztl[s][i--];
    p=2*(i/8);
    ztl[s][i] = ztl[s][i] | tlut(abs(img[ylut[i]+y*ns][xlut[i]+x*ns]));
    ztl[s][p] = ztl[s][p] | ztl[s][i--];
    ztl[s][i] = ztl[s][i] | tlut(abs(img[ylut[i]+y*ns][xlut[i]+x*ns]));
    ztl[s][p] = ztl[s][p] | ztl[s][i--];
    }
for(i=15;i>=0;i--)
    {
    ztl [s][i] = ztl[s][i] | tlut(abs(img[ylut[i]+y*ns][xlut[i]+x*ns]));
    p = i/4;
    ztl[s][p] = ztl[s][p] | ztl[s][i];
    }
```

In sequence code (3), above, the index p, computed directly from the symbol scanning index i, accesses and updates the parent's ztl location, and routine tlut(*) zeros all but the most significant bit position of its argument. Sequence code (3) assumes that NSCALES=4 and hence that index i goes from 255 to 0 (i.e., reverse symbol scanning order). For NSCALES=5, the index calculation between i=1023 and 256 is given by p=8*(i/32)+q for q=(7,6, . . . ,0), and this progression continues with increasing values of NSCALES. Also, sequence code (3) must be performed for every zerotree index (x,y) or, equivalently, every s once prior to the start of the symbol generation and coding process.

Unlike sequence code (3), the symbol generation and scanning pass in the encoder must be applied repeatedly for successively lower bit planes, e.g., smaller values of THRESH, until either the bit allocation for the image is exhausted or until some distortion target for the reconstructed image is met. For NSCALES=4, the dominant pass that determines whether a given coefficient is significant can be computed as shown in code sequence (4), below:

```
/* for i=0 */
    for(s=0;s<121;s++)
        comp_dbits(0,1,2,3,dummy arg,s);
    if (STOP==0)
        for(i=1;i<4;i++)
            {
            c=4*i;
            for(s=0;s<121;s++)
                comp_dbits(i,c,c+1,c+2,c+3,s);
            }
```

-continued

```
if (STOP==0)
   for(i=4;i<16;i++)
      {
      c = 8*(i/2) + 2*(i%2);
      for(s=0;s<121;s++)
         comp_dbits(i,c,c+1,c+4,c+5,s);
      }
if (STOP==0)                                              (4)
   for(i=16;i<64;i++)
      {
      c = 16*(i/4) + 2*(i%4);
      for(s=0;s<121;s++)
         comp_dbits(i,c,c+1,c+8,c+9,s);
      }
start_model(3);    /* Encodes and transmits only 3 symbol alphabet */
if (STOP==0)
   for(i=64;i<256;i++)
      {
      for(s=0;s<121;s++)
         comp_dbits2(i,s);
      }
```

The routines comp_dbits(*) and comp_dbits2(*) compute the symbol which should be transmitted for the wavelet coefficient indexed by i with the 4 children of this coefficient (three plus a dummy address for i=0) passed to comp_dbits(*) as absolute indices into array img. Note that the children are calculated using simple algebraic equations. In formula (4), above, all 121 zerotrees (the original image in this case is 176×176 pixels) are coded together as indicated by the statement for(s=0;s<121;s++). If regionally partitioned coding is desired, it can be easily achieved by moving this for loop elsewhere in the program. The structure of the for loops in code sequence (4) also clearly illustrates that the transform coefficients are scanned in a predetermined, deterministic order. Furthermore, this ordering can be altered easily simply by altering the s and i for loops. As long as these loops are also altered in exactly the same way in the decoder, the combined encoding and decoding system will function correctly. Routine comp_dbits(*) is given by code sequence (5), below:

```
void comp_dbits(m,c1,c2,c3,c4,s)
   int m,c1,c2,c3,c4,s;
   {
   int sym,t,tflg,apx,y,x,ns;
   ns = (1<<NSCALES);
   y = s/AX;
   x = s%AX;
   if ((flag[s][m]&6)==0)
      {
      tflg = ((THRESH&ztl[s][m]) == 0);
      t = abs(img[ylut[m]+y*ns][xlut[m]+x*ns])>=THRESH;
      sym = t + (t&(img[ylut[m]+y*ns][xlut[m]+x*ns]>0)) + ((~tflg)&1);
      sym = char_to_index[sym];                         (5)
      encode_symbol(sym);
      update_model(sym);
      img[ylut[m]+y*ns][xlut[m]+x*ns] = t ?
(abs(img[ylut[m]+y*ns][xlut[m]+x*ns]))-THRESH-THRESH/2 :
img[ylut[m]+y*ns][xlut[m]+x*ns];
      flag[s][c1] = flag[s][c1] | (tflg<<1);
      flag[s][c2] = flag[s][c2] | (tflg<<1);
      flag[s][c3] = flag[s][c3] | (tflg<<1);
      flag[s][c4] = flag[s][c4] | (tflg<<1);
      flag[s][m] = (t!=0)<<2;
      }
   else if ((flag[s][m]&2)!=0)
      {
      flag[s][m] = flag[s][m] & 252;
      flag[s][c1] = flag[s][c1] | 2;
      flag[s][c2] = flag[s][c2] | 2;
      flag[s][c3] = flag[s][c3] | 2;
      flag[s][c4] = flag[s][c4] | 2;
      }
}
``` where THRESH specifies the current bit plane being scanned, sym is the generated symbol, i.e., +=3, −=2, 0=1, ZTR=0, and encode_symbol(*) along with update_model(*) losslessly encode sym using the arithmetic encoder. If bit 2 of array "flag" is set, then the current coefficient should not be transmitted because a ZTR symbol was sent above it in its zerotree. This status bit must be passed on to its children as indexed by c1 through c4 (the "else if" statement). Bit 3 of array "flag" is set when a coefficient is determined to be significant (i.e., a + or − has been transmitted), and it guarantees that the encoder never sends the same coefficient twice. Finally, 1 bit of storage in the ztl[ ] array is required during each pass, resulting in a total scratch memory allocation of 3 bits per wavelet coefficient, in addition to the memory used for the coefficient itself. Routine comp_dbits2(*) is given by code sequence (6), below:

```
void comp_dbits2(m,s)
   int m,s;
   {
   int sym,t,tflg;
   if ((flag[s][m]&6)==0)
      {
      t = abs(img[ylut[m]+y*ns][xlut[m]+x*ns])>=THRESH;
      sym = t + (t&(img[ylut[m]+y*ns][xlut[m]+x*ns]>0)) + ((~tflg)&1);
      sym = char_to_index[sym];
      encode_symbol(sym);                               (6)
      update_model(sym);
      img[ylut[m]+y*ns][xlut[m]+x*ns] = t ?
(abs(img[ylut[m]+y*ns][xlut[m]+x*ns]))-THRESH-THRESH/2 :
img[ylut[m]+y*ns][xlut[m]+x*ns];
      flag[s][m] = (t!=0)<<2;
      }
   else if ((flag[s][m]&2)!=0)
      {
      flag[s][m] = flag[s][m] & 252;
      }
}
``` and is essentially identical to sequence code (6) except that the coefficients it processes are leafs of the zerotrees and thus have no children.

The final process implemented by the encoder is the successive refinement of the wavelet coefficients which have already been transmitted to the decoder. As seen in sequence codes (5) and (6), when a wavelet coefficient has been determined to be significant, its value in array "img" is replaced by its approximation error; thus, the coding process is also in-place in that it replaces wavelet coefficients in the array with intermediate results as it goes along. This approximation error is then further reduced by the subordinate pass, shown in code sequence (7), below:

```
start_model(2); /* Sets arithmetic coder model for 2 symbol alphabet */
/* Subordinate Pass */
t = THRESH/2;
ns = (1<<NSCALES);
i=0;
while ((i<256)&&(STOP==0))
```

```
{
  s=0;
  while ((s<121)&&(STOP==0))
  {
    if ((flag[s][i]&4) != 0)                                    (7)
    {
      y=s/AX;
      x=s%AX;
      sym = (img[ylut[i]+y*ns][xlut[i]+x*ns]>0)&1;
      img[ylut[i]+y*ns][xlut[i]+x*ns] -= ((sym>0)?1:-1)*t/2;
      sym = char_to_index[sym];
      encode_symbol(sym);
      update_model(sym);
    }
    s++;
  }
  i++;
}
```

The implementation of the subordinate refinement pass in sequence code (7) is different than that disclosed in U.S. Pat. No. 5,315,670 (Shapiro). In particular, the encoder of U.S. Pat. No. 5,315,670 (Shapiro) sends refinement bits for the coefficients in the order that they were determined to be significant. By contrast, sequence code (8) always sends refinement bits according to the fixed symbol scanning order; the lowest frequency coefficients first followed by higher frequencies later. This eliminates the need for an explicit subordinate linked list and thus greatly reduces the memory requirements with little cost in rate-distortion performance. After the process described by sequence code (7) is complete, the threshold THRESH is reduced by ½ and the combination of sequence codes (4) and (7) are repeated. A block diagram of this iteration is shown in FIG. 10A.

The indexing methods described herein can be easily applied to regionally partitioned image compression. In the case where maximal partitioning, i.e., each zerotree is encoded separately, is desired, sequence code (4) is altered as shown in code sequence (8), below:

```
/* for i=0 */
comp_dbits(0,1,2,3,dummy arg,s);
if (STOP==0)
  for(i=1;i<4;i++)
  {
    c = 4*i;
    comp_dbits(i,c,c+1,c+2,c+3,s);
  }
if (STOP==0)
  for(i=4;i<16;i++)
  {
    c = 8*(i/2) + 2*(i%2);
    comp_dbits(i,c,c+1,c+4,c+5,s);
  }
if (STOP==0)                                                    (8)
for(i=16;i<64;i++)
  {
    c = 16*(i/4) + 2*(i%4);
    comp_dbits(i,c,c+1,c+8,c+9,s);
  }
start_model(3);    /* Encodes and transmits only 3 symbol alphabet */
if (STOP==0)
  for(i=64;i<256;i++)
  {
    comp_dbits2(i,s);
  }
``` and s is now passed to sequence code (8) as an argument. Similarly, sequence code (7) is also modified to accept s as an argument, as shown in code sequence (9), below:

```
start_model(2); /* Sets arithmetic coder model for 2 symbol alphabet */
t = THRESH/2;
ns = (1<<NSCALES);
i=0;
while ((i<256)&&(STOP==0))
{
  if ((flag[s][i]&4) != 0)                                      (9)
  {
    y = s/AX;
    x = s%AX;
    sym = (img[ylut[i]+y*ns][xlut[i]+x*ns]>0)&1;
    img[ylut[i]+y*ns][xlut[i]+x*ns] -= ((sym>0)?1:-1)*t/2;
    sym = char_to_index[sym];
    encode_symbol(sym);
    update_model(sym);
  }
  i++;
}
```

After executing sequence code (2) as normal, spatially partitioned encoding can be achieved as shown in code sequence (10), below:

```
for(y=0;y<AY;y++)
for(x=0;x<AX;x++)
{
  s = AX*y+x;
  THRESH = starting threshold;
  STOP = 0;                                                     (10)
  while(STOP==0)
  {
    run (8);
    run (9);
    THRESH = THRESH/2;
  }
}
``` where STOP is again set when either a target bit rate or distortion level has been met, $AY=YSIZE/2^{NSCALE}$ and $AX=XSIZE/2^{NSCALES}$. The starting threshold is selected to be the smallest power of 2 number greater than ½ the magnitude of the largest wavelet coefficient. The bit stream generated by sequence code (10) can then be regionally decoded. If a fixed distortion level is required, however, for example lossless compression, then each zerotree will need a different number of bits to achieve that level. Thus, it becomes necessary to transmit as side information a locator table at the start of the compressed bit stream which allows the decoder to correctly parse the stream into zerotree partitions. Using a simple offset scheme, e.g., zerotree 2 starts 253 bytes after zerotree 1, zerotree 3 starts 157 bytes after 2, etc., such a table can be constructed which adds less than 0.02 bits/pixel to the total bit rate for an image, which is a trivial amount for lossless or almost lossless compression. The combination of this table and a fully partitioned, losslessly compressed embedded bit stream allows a user to directly access any region within an image at any quality, from highly lossy to absolutely lossless. Such control supports a variety of remote access/sensing applications including Internet web browsing, telemedicine, weapons video transmission, such as bomb damage indication and weapons control video in future military systems.

While two cases of regional bit stream partitioning, none and fully partitioned, have been illustrated, any variation in between these two extremes can also be easily implemented within the framework provided herein, as zerotrees can be individually accessed and thus the spatial regions to which they correspond. These variations are applicable for regionally-decodable compression and also for both robust embedded compression and fast, cache-based zerotree processing.

The decoder of the present invention simply accepts the bit stream coming from the encoder, arithmetically or otherwise losslessly, decodes it to create the symbol stream, and then processes these symbols to progressively building up the significance map and the subordinate list in the exact same way as they were created by the encoder, as illustrated in FIG. 10B. With this precise synchronization the resolution enhancement bits transmitted during the subordinate pass do not need any location specifiers, as the decoder recognizes the exact transmission order of these bits because it has reconstructed the same subordinate list as the encoder had at that point in the processing. The lifted 4-band synthesis filter corresponding to FIG. 4 which perfectly inverts sequence code (1) is given in C by code sequence (11), below:

```
index = 1<<scale;
/* Perform horizontal inverse transform */
for(k=0;k<YSIZE;k+=index)
    {
    img[k][0] = (img[k][0]-img[k][index])>>1;
    for(l=index;l<XSIZE/2;l+=index)
        {
        img[k][2*l] = (img[k][2*l]>>1) - ((img[k][2*l+index]+ img[k][2*l-index])>>2);
        img[k][2*l-index] += ((img[k][2*l]+ img[k][2*l-2*index])>>1);
        }
    img[k][XSIZE-index] += img[k][XSIZE-2*index];
    }
/* Perform vertical inverse transform */                    (11)
for(k=0;k<XSIZE;k+=index)
    {
    img[0][k] -= img[index][k];
    for(l=index;l<YSIZE/2;+=index)
        {
        img[2*l][k] -= ((img[2*l+index][k]+ img[2*l-index][k])>>1);
        img[2*l-index][k] = (img[2*l-index][k]<<1) + ((img[2*l][k]+ img[2*l-2*index][k])>>1);
        }
    img[YSIZE-index][k] = (img[YSIZE-index][k]<<1) + img[YSIZE-2*index][k];
    }
``` where XSIZE is again the horizontal dimension of the image and YSIZE the vertical dimension. In this case, scale starts equal to NSCALES, the number of decomposition levels of the wavelet transform, and array img contains the wavelet coefficients as output by sequence code (1) or as reconstructed by the decoding process. With each subsequent iteration, scale is decreased by 1. After the final iteration, with scale set equal to zero, array img will contain the original image or, if the coefficients were compressed in a lossy fashion, an approximation of it. The decoder forms its approximation to the wavelet coefficients directly in the in-place 2D array which will be processed by the lifted inverse wavelet transform. As in the encoder, the xlut[ ] and ylut[ ] tables are defined by sequence code (2). In order to decode the significance map and effectively "invert" the dominant pass as given by sequence code (4), the following algorithm (12) is executed:

```
for(s=0;s<121;s++)
    dec_dbits(0,1,2,3,dummy argument,s);
for(m=1;m<4;m++)
```

```
    {
    c=4*m;
    for(s=0;s<121;s++)
        dec_dbits(m,c,c+1,c+2,c+3,s);
    if (STOP==1)
        break;
    }
for(m=4;m<16;m++)
    {
    c=8*(m/2) + 2*(m%2);
    for(s=0;s<121;s++)
        dec_dbits(m,c,c+1,c+4,c+5,s);
    if (STOP==1)
        break;
    }                                                       (12)
for(m=16;m<64;m++)
    {
    c = 16*(m/4) + 2*(m%4);
    for(s=0;s<121;s++)
        dec_dbits(m,c,c+1,c+8,c+9,s);
    if (STOP==1)
        break;
    }
start_model(3);
for(m=64;m<256;m++)
    {
    for(s=0;s<121;s++)
        dec_dbits2(m,k);
    if (STOP==1)
        break;
    }
```

The structure is essentially identical to that of sequence code (4) with the absolute children indices now sent to dec_dbits (*) instead. Note that the same deterministic coefficient scanning order, as defined by the two for loops, must be used by the decoder in code sequence (12) as was used by the encoder in code sequence (5). The following C code can be used to implement dec_dbits(*) as shown in code sequence (13), below:

```
void dec_dbits(i,c1,c2,c3,c4,s)
int i,c1,c2,c3,c4,s;
{
int sym,symbol,t,x,y,ns;
ns = (1<<NSCALES);
y = s/AX;
x = s%AX;
 if ((flag[s][i]&5)==0)
 {
sym = decode_symbol();
if (sym==EOF_symbol)
 STOP=1;
else
{
symbol = index_to_char[sym];
update_model(sym);
if (symbol == 3)
{
flag[s][i] = 3;
img[ylut[i]+y*ns][xlut[i]+x*ns] = THRESH+(THRESH>>1);
}
else if (symbol == 2)                                    (13)
{
flag[s][i] = 1;
img[ylut[i]+y*ns][xlut[i]+x*ns] = -THRESH-(THRESH>>1);
}
else if (symbol==0)
{
flag[s][c1] = flag[s][c1] | 4;
flag[s][c2] = flag[s][c2] | 4;
flag[s][c3] = flag[s][c3] | 4;
flag[s][c4] = flag[s][c4] | 4;
}
}
}
else if ((flag[s][i]&4)!=0)
{
flag[s][i] = flag[s][i] & 251;
flag[s][c1] = flag[s][c1] | 4;
flag[s][c2] = flag[s][c2] | 4;
flag[s][c3] = flag[s][c3] | 4;
flag[s][c4] = flag[s][c4] | 4;
}
}
```

As with comp_dbits(*) in sequence code (5), dec_dbits(*) uses a flag register to skip coefficients which were not transmitted because of ZTR symbols (bit 3 of flag) and to keep track of significant coefficients (bit 1). However, unlike the encoder it must also keep track of the sign of each significant coefficient, and this is done using bit 2 of the flag array. Again, 3 bits of side information must be stored for each wavelet coefficient. As in sequence code (5), the algebraically computed absolute indices of the children are used in a pass-down fashion to block out coefficients for which no symbols were transmitted. Also, routine decode_symbol() is called to convert the raw bit stream into the symbol stream used here, and the update_model(*) routine is again employed to adapt the symbol probability estimates. Both of these routines are disclosed in Arithmetic Coding for Data Compression, by I. H. Witten, R. M. Neal, and J. G. Cleary in *Communications of the ACM,* Vol. 30, No. 6, June 1987, pp. 520–540, the disclosure of which is herein incorporated by reference. Routine dec_dbits2(*) is given by code sequence (14), below:

```
void dec_dbits(i,s)
int i,s;
{
int sym,symbol,t,x,y,ns;
ns = (1<<NSCALES);
y = s/AX;
x = s%AX;
 if ((flag[s][i]&5)==0)
 {
sym = decode_symbol();
if (sym==EOF_symbol)
 STOP=1;
else
{
symbol = index_to_char[sym];
update_model(sym);
if (symbol == 2)                                          (14)
{
flag[s][i] = 3;
   img[ylut[i]+y*ns][xlut[i]+x*ns] =
     THRESH+(THRESH>>1);
}
else if (symbol == 1)
{
flag[s][i] = 1;
img[ylut[i]+y*ns][xlut[i]+x*ns] =
     -THRESH-(THRESH>>1);
}
}
}
else if((flag[s][i]&4)!=0)
flag[s][i] = flag[s][i] & 251;
}
``` where it is distinguished from sequence code (13) primarily in that the coefficients processed are the leafs of zerotrees and thus have no children. The symbol definitions are changed slightly since only 3 symbols are transmitted by comp_dbits2(*): +=2, −=1, and 0=0.

After sequence code (12) has been completed for a given threshold THRESH, the decoder must process the refinement symbols created during the encoder's subordinate pass. This is done as shown in code sequence (15), below:

```
/* DECODE RESOLUTION INCREASE */
t = THRESH/2;
ns = (1<<NSCALES);
for(i=0;i<BS*BS;i++)
 for(s=0;s<121;s++)
{
if(STOP == 1)
 break;
if((flag[s][i]&1)==1)
{
y = s/AX;
x = s%AX;                                                  (15)
sym = decode_symbol();
if (sym==EOF_symbol)
 STOP=1;
else
 {
symbol = index_to_char[sym];
update_model(sym);
img[ylut[i]+y*ns][xlut[i]+x*ns] += (((flag[s][i]&2)>0) ?
1:-1)*(((1&symbol)>0) ? 1:-1)*((t+1)/2);
 }
}
}
```

Starting with an initial threshold THRESH (transmitted as side information from the encoder), processes of sequence codes (12) and (15) are executed, THRESH is reduced by ½, and then the processes are repeated until either an end-of-file (EOF) symbol is received or until a user-specified number of bits have been decoded. At this point, appropriate wavelet inversion, e.g., sequence code (11), is performed directly on array img, resulting in an approximation of the original image. For regionally partitioned compression, sequence codes (12) and (15) can be modified to be compatible with sequence codes (8) and (9) simply by removing the for loops on the zerotree scanning index s. A decoding algorithm analogous to sequence code (10) is straight-forward.

The foregoing summary, description and drawings of the invention are not intended to be limiting, but are only exemplary of the inventive features which are defined in the claims.

What is claimed is:

1. A method for converting an image, comprising the steps of:
   acquiring an image;
   storing the acquired image as a data array in a memory system;
   progressively replacing pixel elements of the stored data array with transform coefficient elements through the lifted transformation;
   scanning the transform coefficients to create an embedded symbol stream; and,
   losslessly encoding the embedded symbol stream to create an embedded bit stream.

2. The method of claim 1, further comprising the step of:
   transmitting the created embedded bit stream.

3. The method of claim 1, further comprising the step of:
   storing the created embedded bit stream in a memory system.

4. The method of claim 1, wherein the step of scanning the transform coefficients comprises a predetermined deterministic order.

5. The method of claim 1, wherein the step of scanning the transform coefficients comprises a symbol generation process.

6. The method of claim 1, wherein the symbol generation process comprises the step of storing residual values in a memory location that previously contained its associated wavelet transform coefficient.

7. The method of claim 1, wherein the step of scanning the transform coefficients comprises from about 3 or more additional bits per data array element used to temporarily store status information in creating the embedded bit stream.

8. The method of claim 1, wherein the step of scanning the transform coefficients comprises accessing the wavelet coefficient data array with absolute addressing.

9. The method of claim 1, wherein the step of scanning the transform coefficients comprises specifying a search order within each zerotree through a lookup table with the size of the lookup table dependant on the depth of the wavelet decomposition used.

10. The method of claim 1, wherein the embedded symbol stream is created using zerotree parent and child locations accessed through direct algebraic calculation.

11. The method of claim 1, further comprising the steps of:
    losslessly decoding the bits to create a sequence of symbols;
    converting the sequence of symbols into an array wavelet coefficients that describes the acquired image;
    converting the coefficient array into a pixel array; and,
    outputting the resultant image.

12. The method of claim 11, wherein the step of converting the sequence of symbols successively generates approximations of the wavelet coefficients placed in a stored data array and performs an inverse lifted transform thereon.

13. The method of claim 11, wherein the step of converting the sequence of symbols comprises from about 3 or more additional bits per data array element used to temporarily store status information.

14. The method of claim 11, wherein the step of converting the sequence of symbols comprises accessing the wavelet coefficient data array with absolute addressing.

15. The method of claim 11, wherein the step of converting the sequence of symbols comprises specifying a search order within each zerotree through a lookup table with the size of the lookup table dependant on the depth of the wavelet decomposition used.

16. The method of claim 11, wherein the zerotree parent and child locations are accessed through direct algebraic calculation.

* * * * *